United States Patent [19]

Lee

[11] Patent Number: 4,713,822
[45] Date of Patent: Dec. 15, 1987

[54] LASER DEVICE

[75] Inventor: Chun-Sheu Lee, Torrance, Calif.

[73] Assignee: Amada Engineering & Service Co., Inc., La Mirada, Calif.

[21] Appl. No.: 737,485

[22] Filed: May 24, 1985

[51] Int. Cl.⁴ .............................................. H01S 3/09
[52] U.S. Cl. .................................... 372/69; 372/75; 372/101; 372/66; 372/6
[58] Field of Search ............. 372/66, 6, 72, 75, 101, 372/69, 70

[56] References Cited

U.S. PATENT DOCUMENTS

| | | | |
|---|---|---|---|
| 3,665,335 | 5/1972 | Tomiyasu | 372/66 |
| 3,679,996 | 7/1972 | Almasi et al. | 372/66 |
| 3,828,264 | 8/1974 | Friedl et al. | 372/6 |
| 3,835,414 | 9/1974 | Ahearn | 378/101 |
| 4,136,929 | 1/1979 | Suzaki | 372/6 |
| 4,358,851 | 11/1982 | Scifres et al. | 372/6 |
| 4,504,950 | 3/1985 | Au Yeung | 372/101 |
| 4,553,238 | 11/1985 | Shaw et al. | 372/6 |
| 4,555,786 | 11/1985 | Byer | 372/34 |
| 4,575,854 | 3/1986 | Martin | 372/36 |
| 4,617,669 | 10/1986 | Kuhn | 372/34 |
| 4,627,068 | 12/1986 | Johnson et al. | 372/6 |

Primary Examiner—Leon Scott, Jr.
Attorney, Agent, or Firm—Wigman & Cohen

[57] ABSTRACT

The present invention relates to a laser device in which an optical resonator and a slab-geometry laser medium are dioposed within said optical resonator. There is also a pump which optically excites said laser medium from one or both sides of the slab-geometry laser medium.

6 Claims, 11 Drawing Figures

LASER DEVICE

FIELD OF THE INVENTION

This invention relates to a face-cooled, side-pumped laser device and in particular to a miniature laser device wherein the beams of electromagnetic radiation from a laser-diode array, transmitted through a bundle of optical fibers, are used to excite a slab-geometry, solid-state laser medium.

BACKGROUND OF THE INVENTION

In conventional face-cooled, face-pumped slab lasers shown in FIG. 1(a) and FIG. 1(b), active medium 10 is pumped through faces 11 and 12 by flashlamps 23 and 24, respectively, to excite atoms of the active medium 10 to a metastable state and thereby produce a population inversion therein. Heretofore, the flashlamp pumping radiation excites atoms around the optical path of the flashlamp pumping radiation through the slab.

However, in the conventional laser device described above, the length of said optical path is only about a thickness d of the slab-geometry laser medium 10; i.e., the effective optical path through the slab for the flashlamp pumping radiation is relatively short. As a result, the energy transfer efficiency from the flashlamp radiation energy to the laser slab storage energy is small.

Moreover, the use of flashlamp in pumping solid-state ion lasers has several drawbacks. Firstly, the ratio of flashlamp radiation within the absorption bands of the laser material to the total lamp radiation is small. This is because the lamp radiation covers a broad spectrum, whereas the absorption bands for most of the solid-state ion laser materials (e.g., Ruby, Nd:YAG, Nd:GGG, etc.) are narrow. As a result, a substantial part of the pump radiation energy is not transferred to the storage energy in the laser slab. Secondly, the short wavelength (i.e. UV) radiation from the flashlamp output is parasitic to the laser material by creation of color center in the laser medium, which can degrade laser performance, as well as increase the thermal load in the laser medium. Thirdly, the lifetime of the flashlamps is relatively short, since the large discharge current is supplied to the flashlamp.

SUMMARY AND OBJECTS OF THE INVENTION

Accordingly, it is the primary object of the present invention to provide a laser device overcoming the shortcomings of the prior art of laser devices as mentioned above.

It is another object of the present invention to provide a laser device which has a long optical path of the pumping radiation in the laser medium for achieving high transfer efficiency from the flashlamp radiation energy to the laser slab storage energy.

It is another object of the the present invention to provide a laser device which has a pumping source whose pumping radiation spectrum matches the absorption bands of the laser medium for achieving high coupling efficiency between the pumping radiation and the atoms of the active medium.

It is another object of the present invention to provide a laser device which has a pumping source whose radiation spectrum includes no short wavelength (i.e. UV) components so that the the pumping radiation is not parasitic to the laser material.

It is further object of the present invention to provide a laser device which has a pumping source whose lifetime is a relatively long, compared with the comventional flashlamp.

These and other objects and features of the invention will be more clearly understood from the following detailed description taken in conjunction with the drawing.

SUMMARY OF THE INVENTION

The present laser device comprises an optical resonator comprising a pair of mirrors, a slab-geometry active laser medium disposed between said mirrors and a pumping means optically exciting said laser medium from one or both sides of said slab-geometry laser medium. The pumping means comprises a laser-diode whose output beam has a spectrum matched with the absorption bands of said laser medium.

DETAILED DESCRIPTION OF EMBODIMENTS

Figure 1A:
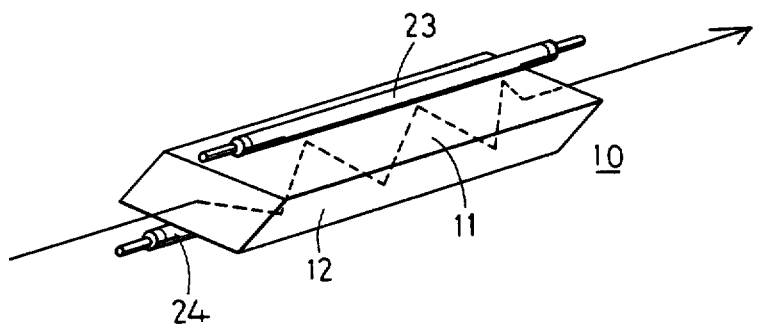
FIG. 1(a) is a perspective illustration of a conventional laser device.

Referring to the drawing, FIGS. 2, 3(a), 3(b) and 3(c) show a first embodiment of the present invention comprising an optical resonator defined by a pair of mirrors 16 and 17; a slab-geometry active laser medium 10; and a pumping means 11 and 12.

The slab-geometry active laser medium 10, which is homogeneous, is disposed in the optical resonator defined by a pair of mirrors 16 and 17. The end faces 13 and 14 of the laser medium 10 are fabricated at the Brewster angle with respect to the longitudinal axis 15. The homogeneous slab-geometry active medium 10 is optically excited by the laser-diode arrays 11 and 12 from both sides of the slab. The faces 31 and 32 are subjected to cooling whereas the sides 41 and 42 are thermally isolated.

In one embodiment, the active medium 10 may comprise neodymium doped YAG or GGG crystal, of which absorption bands extend $E \approx 0.5$ $\mu$m–0.9 $\mu$m. The laser diode array 11 and 12 may comprise a galium-aluminum-arsenide (GaAlAS) laser diode, which emits the pumping radiation having a spectrum $\lambda \approx 0.7$ $\mu$m–0.8 $\mu$m.

In operation, the pump radiation beam emitted from the laser-diode-arrays 11 and 12 propagate through the slab-geometry active medium 10 from side 41 to side 42, and vice versa. The pump radiation beam then excites atoms around the optical path of the beam through the medium 10 to a metastable state, and thereby produces a population inversion therein.

Figure 1B:
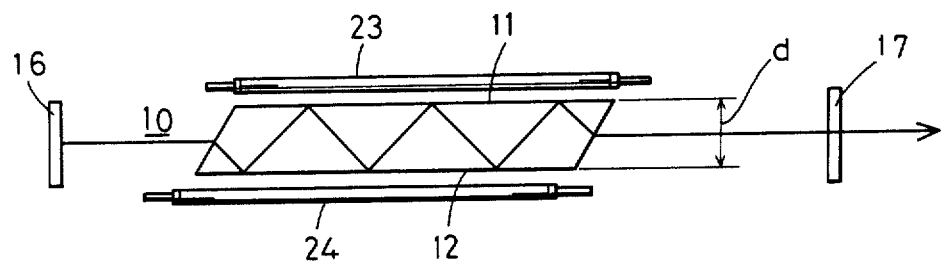
FIG. 1(b) is a side-view of the conventional laser device.
Figure 2:
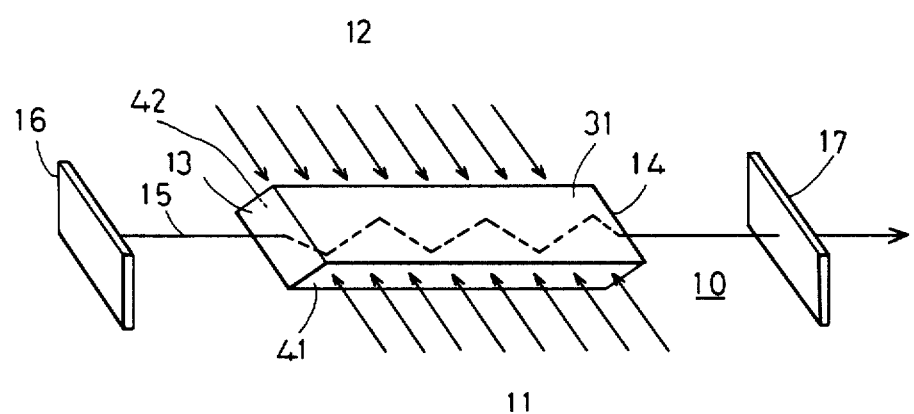
FIG. 2 is a schematic illustration of a first embodiment of the present invention.
Figure 3A:
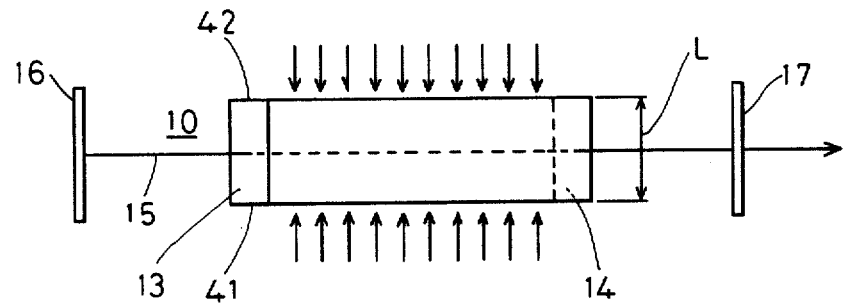
FIGS. 3(a), 3(b) and 3(c) are a face-view, a side-view and an end-view, respectively of the first embodiment of the present invention.
Figure 3B:
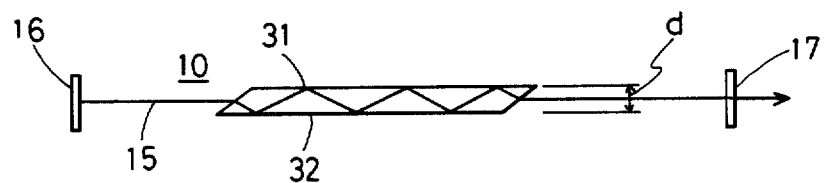
Figure 3C:
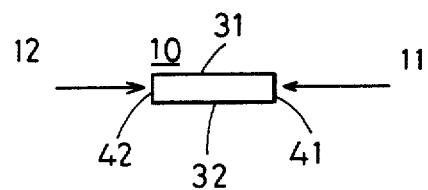

Accordingly, in the first embodiment of the invention described above, the length of the optical path of the beam through the medium 10 is the width L of the slab 10. The length is therefore relatively long compared with that of the conventional laser device, which is the thickness d of the slab 10. As a result the atoms of the active medium 10 for the present invention are more strongly excited by the pump radiation compared with those of the active medium for in the conventional laser device shown in FIGS. 1(a) and 1(b).

Moreover, since the spectrum of the pump radiation is narrow and matches with the absorption bands of the active laser medium 10, the pump radiation energy is so effectively transferred to the storage energy in the laser medium without creating any color centers. And the pumping means comprising the laser-diode has a longer lifetime compared with the conventional flashlamp, for such a large current is not supplied to the laser diode as is used in the conventional flashlamp.

Figure 4:
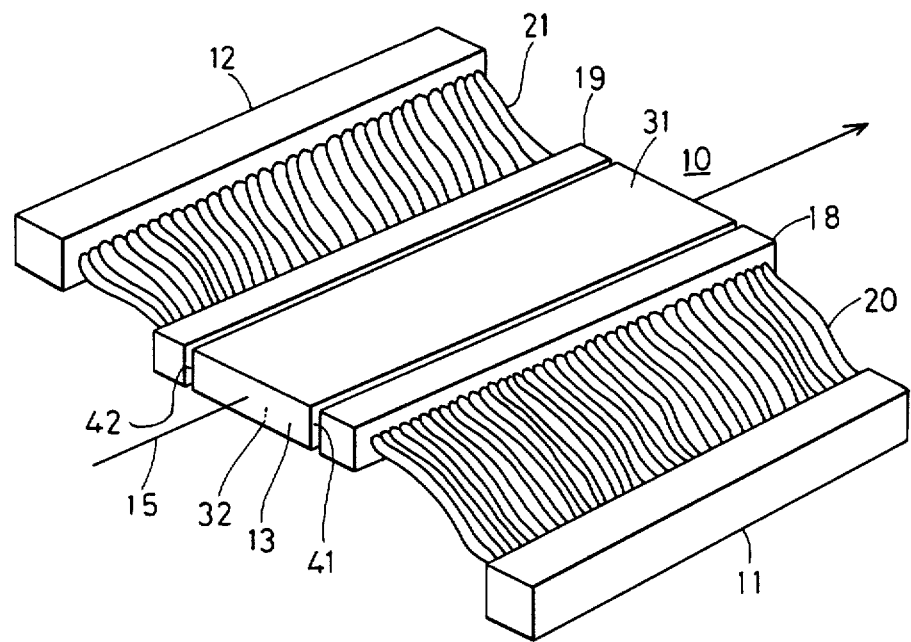
FIG. 4 is a schematic illustration of a second embodiment of the present invention.

FIG. 4 shows a second embodiment of the present invention. The beams of the radiation from the laser-diode arrays 11 and 12 are guided by the flexible optical fibers (e.g. fused silica fiber) 20 and 21. The output beams from the optical fibers 20 and 21 are then collimated by the cylindrical beam collimators 18 and 19. The collimated beams are then used for side pumping of the laser slab 10.

Therefore, the bunch of the radiation beams propagate through slab-geometry laser medium 10 along paths which are substantially parallel to the faces 31 and 32. In other words, the radiation beams never diverge outwards through faces 31 and 32 to lose the radiation energy in the active medium, so that the pump radiation can excite more effectively the atoms of the laser medium 10.

Figure 5:
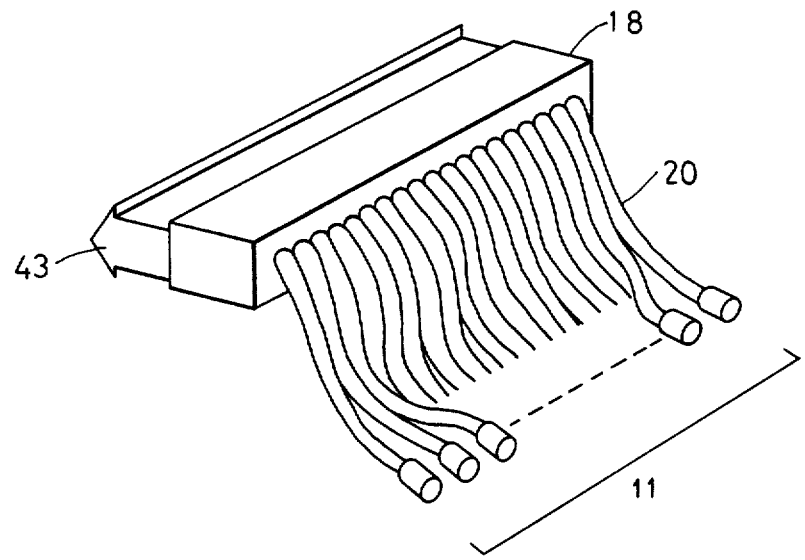
FIG. 5 is a schematic illustration of a laser-diode-pump-module which is used in the second embodiment of the present invention shown in FIG. 4.

FIG. 5 shows a laser-diode-pump-module (LDPM) which comprises a laser-diode array 11, bundles of optical fibers 20 and an array of cylindrical beam collimators 18.

Figure 6:
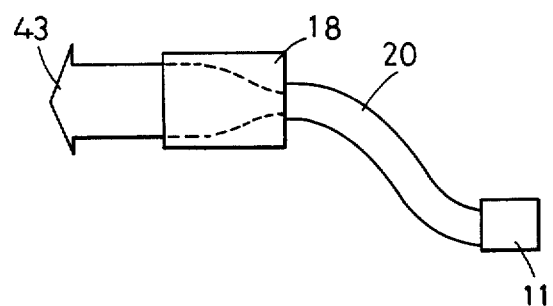
FIGS. 6, 7 and 8 are side-views of first, second and third embodiments of a beam collimater which is an element of the laser-diode-pump-module.
Figure 7:
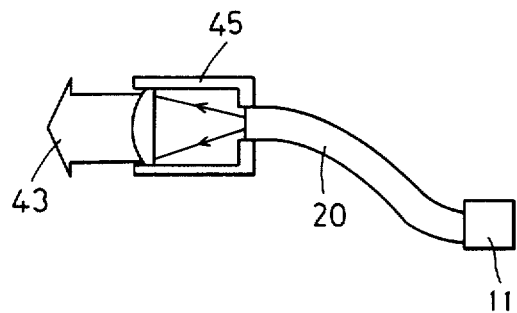
Figure 8:
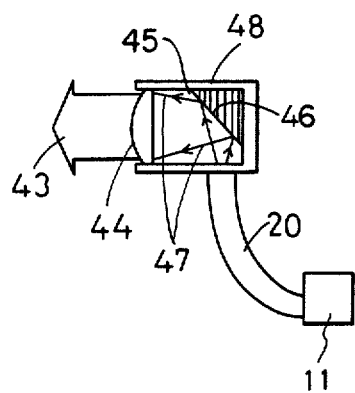

FIGS. 6, 7 and 8 are the different embodiments of the beam collimator 18. The first embodiment of the beam collimator 18 shown in FIG. 6, comprises the gradient-index cylindrical lens, wherein the end of the optical fiber bundle 20 is disposed substantially at the focal point of the gradient-index cylindrical lens 18 to collimate the radiation beam emitted from the optical fiber bundle.

The second embodiment of the beam collimator 18 shown in FIG. 7 comprises a chamber wall 45 having an opening at left side and a bore at right side, said chamber wall forming a cavity therein, a cylindrical focussing lens 44 fitted in said opening, said optical fiber bundle 20 inserted into said cavity through said bore. The end of the fiber bundle 20 is disposed at the focal point of the focussing lens 44.

The third embodiment of the beam collimator 18 shown in FIG. 8 comprises a chamber wall 48 having a opening at left side at the bore at the bottom, said chamber wall forming a cavity therein, a cylindrical focussing lens 44 fitted in said opening, said optical fiber bundle 20 inserted into said cavity 45 through said bore, reflecting mirrors 46 disposed in the cavity so that the radiation beams 47 emitted from the end face of said optical fiber 20 are deflected to the surface of the focussing lens 44. The optical path of the radiation beam 47 from the end of the fiber bundle 20 to the focussing lens 44 is substantially equal to the focal length of the lens 44.

To summarize, a long-lived, efficient miniature slab laser system is achieved by utilizing a laser-diode array as the pump source. Side-pumping configuration in which the pump radiation experiences greater optical thickness through the laser slab, can enhance the transfer efficiency from the pump radiation energy to the storage energy in the laser slab. Optical fibers through which the beams of the laser-diode array are transmitted are used to provide a more flexible system design and to prevent the heat generated in the laser-diode array from reaching the laser slab.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A comprising:
   an optical resonator;
   a slab-geometry solid state laser medium disposed within said optical resonator and having a longitudinal axis and a rectangular cross section transverse to said longitudinal axis, said rectangular cross section having a substantially constant height and width along said longitudinal axis, the width dimension being greater than the height dimension, the height of said rectangular cross section being defined by parallel top and bottom surfaces, the width of said rectangular cross section being defined by first and second side surfaces, and end faces of the medium along the longitudinal axis being fabricated at a Brewster angle with respect to the top or bottom surface so that the laser beam transmits in the medium along a zig-zag path bended by the top and bottom surfaces;
   pumping means for optically exciting said slab-geometry laser medium through at least one of said first and second side surfaces;
   wherein said pumping means is a laser-diode-pump module which comprises a laser-diode, a beam collimator which is disposed on a face of said side of slab-geometry laser medium, and an optical fiber bundle which guides the radiation beam emitted from said laser diode to said beam collimator.

2. The laser device of claim 1, wherein said beam collimator comprises a gradient-index cylindrical lens.

3. The laser device of claim 1, wherein said beam collimator comprises a chamber wall having an opening at one side and a bore at the opposite side of said one side, said chamber wall forming a cavity therein, a focussing lens fitted in said opening, said optical fiber bundle inserted into said cavity through said bore.

4. The laser device of claim 1, wherein said beam collimator comprises a chamber wall having an opening at one side and a bore at the other side except for the opposite side of said one side, said chamber wall forming a cavity therein, a focussing lens fitted in said opening, said optical fiber 5. The laser device of claim 1 further comprising cooling means in contact with at least one of said top and bottom surfaces of said slab-geometry laser medium.

6. A laser device comprising:
   an optical resonator;
   a slab-geometry solid state laser medium disposed within said optical resonator and having a longitudinal axis and a rectangular cross section transverse to said longitudinal axis, said rectangular cross section having a substantially constant height and width along said longitudinal axis, the width dimension being greater than the height dimension, the height of said rectangular cross section being defined by parallel top and bottom surfaces, the width of said rectangular cross section being defined by first and second side surfaces, and end faces of the medium along the longitudinal axis being fabricated at a Brewster angle with respect to the top or bottom surface so that the laser beam transmits in the medium along a zig-zag path bended by the top and bottom surfaces;

pumping means for optically exciting said slab-geometry laser medium through at least one of said first and second side surfaces;

wherein said pumping means comprises a plurality of laser-diode-pump modules which further comprise a set of laser-diodes whose spectrum matches absorption bands of the laser medium, a set of beam collimators for collimating laser beams emitted from said laser diodes; and a set of optical fiber bundles, connected between said collimators, for guiding the radiation beams emitted from said laser diodes to said beam collimators.

* * * * *

UNITED STATES PATENT AND TRADEMARK OFFICE
CERTIFICATE OF CORRECTION

PATENT NO. : 4,713,822
DATED : December 15, 1987
INVENTOR(S) : CHUN-SHEU LEE

It is certified that error appears in the above-identified patent and that said Letters Patent is hereby corrected as shown below:

IN THE CLAIMS:

Claim 1, line 1 should read --A laser device comprising:--.

Claim 4, last line, after "optical fiber" insert
--bundle inserted into said cavity through said bore, reflecting means disposed in the cavity so that the radiation beams emitted from the end face of said optical fiber are deflect to the surface of said focussing lens.--

Signed and Sealed this

Twenty-eighth Day of June, 1988

Attest:

DONALD J. QUIGG

Attesting Officer

Commissioner of Patents and Trademarks